United States Patent Office 2,861,026
Patented Nov. 18, 1958

2,861,026

VITAMIN B$_{12}$ PREPARATIONS

Edward G. Martin, Whitestone, N. Y., assignor to Chas. Pfizer & Co., Inc., New York, N. Y., a corporation of Delaware No Drawing. Application June 20, 1955
Serial No. 516,803

4 Claims. (Cl. 167—81)

This invention is concerned with methods for the preparation of certain types of vitamin B$_{12}$ preparations. In particular it is concerned with vitamin B$_{12}$ products of particular value as pharmaceutical products. These may be used as such for treatment of various types of anemia and other disease conditions, or they may be used for addition to various other vitamins and therapeutic agents in medicinally useful compositions. They may also be added to animal feeds.

This application is a continuation-in-part of parent application Serial Number 450,789, filed August 18, 1954, by Edward G. Martin, now abandoned.

A variety of vitamin B$_{12}$ preparations have been manufactured and offered commercially for use in enrichment of foods or for use in pharmaceutical preparations of various types. The crystalline vitamin is known and marketed. However, preparation of crystals results in appreciable loss of the costly vitamin and is, naturally, more expensive than the use of cruder products, which, despite their being less than 100% pure, are highly active and effective. When vitamin B$_{12}$ preparations are precipitated from aqueous solutions in the form of crude products, for instance, by addition of a water-miscible organic solvent, they are often gummy, of a poor color, and difficult to mix with other materials in a uniform manner. The material often has a tendency to absorb considerable moisture and to cake in the container in which it is placed.

It has now been found that concentrates of vitamin B$_{12}$ may be precipitated from purified or partially purified aqueous solutions by premixing the aqueous solution with certain organic liquids, and then mixing this original mixture with a larger volume of acetone containing a suspension of certain solid carrier materials to yield products which have many very desirable properties as sources of the vitamin. Among the organic liquids which may be used for the purpose of premixing are methanol, ethanol and acetone. Acetone is the most useful of these. Mixtures of the liquids may also be used for this premixing.

Certain non-toxic solid materials may be suspended in the acetone and used as carriers in the precipitation process indicated above. Besides being non-toxic, the carrier should be insoluble in the final mixture, inert towards the other substances present, and otherwise pharmaceutically acceptable. Generally substances composed of discrete granules, usually less than 100 microns in size, are most useful, as they provide a large surface area. The appearance of the product is enhanced if a white carrier is used. Substances having these characteristics are included in the term "trituration diluents," which may be defined as inert, finely divided, non-toxic, pharmaceutically acceptable solids insoluble in the precipitation mixture. These include sodium chloride, dicalcium phosphate and such organic compounds as mannitol and starch.

The products produced by the present process essentially consist of particles of the trituration diluent with a uniform coating of the vitamin B$_{12}$ product. When reference is made to "vitamin B$_{12}$" in connection with the present invention, it is to be understood that the term includes not only vitamin B$_{12}$ itself, but such other closely related material as vitamin B$_{12a}$, vitamin B$_{12b}$, vitamin B$_{12c}$, etc., as well as mixtures of these products. In many cases these materials are recovered from fermentation broths or byproducts which also contain mixtures of vitamin B$_{12}$ and vitamin B$_{12b}$, with the latter predominating.

The products obtained by the present process have many very desirable properties. As indicated above, they are a convenient form for the introduction of vitamin B$_{12}$-active materials into various pharmaceutical dosage forms such as tablets, capsules, powders, etc. Since these materials do not absorb moisture to any appreciable extent, they do not interfere with the ready blending of the various individual materials used for the preparation of such dosage forms. The products have an exceptional degree of stability despite the fact that the vitamin is exposed to a great extent as thin layers on the surface of the solid material used as the carrier.

Various processes may be utilized for the partial purification of vitamin B$_{12}$ to a status suitable for incorporation in the process of the present invention. Many such methods have been described in the scientific literature or in patents. Among the methods which have been found to be of use are adsorption of the vitamin from impure aqueous solutions such as fermentation broths with certain ion-exchange resins, charcoal, fuller's earth and various other solid adsorbents. The vitamin is then eluted from the surface of the solid with solvents or with dilute aqueous solutions of acids or bases. Further concentrates may be obtained by extraction of the vitamin into such solvents as benzyl alcohol and butyl alcohol, and reextraction into acidified water. Purification may be effected by passage of aqueous concentrates of the vitamin over alumina, which is very useful for the adsorption of various deeply colored impurities. Certain ion exchange resins may also be used for the removal of further impurities.

It has been found that there is a preferred order of addition of the various materials used for the preparation of the concentrates of vitamin B$_{12}$. The acetone is placed in a vessel together with the carrier upon which the vitamin B$_{12}$ is to be precipitated. The premixed concentrate of vitamin is then added to this mixture which is strongly agitated to assure uniform coating of the particles. The aqueous concentrate should be premixed before addition to the acetone and carrier with an approximately equal volume of water-miscible organic liquid or mixture of liquids, but insufficient should be used to cause precipitation of the vitamin B$_{12}$ in the absence of the carrier. This premixing prevents the subsequent formation of gums. It has often been found useful to allow the solid material partially to settle and to remove the supernatant liquid from which the vitamin has been precipitated upon the solid material. Further solvent may then be added to assure the formation of a hard coating on the surface of the solid carrier.

Among the advantages of the present process is the production of a highly uniform vitamin B$_{12}$ material, the potency of which may be readily adjusted by varying the proportion of vitamin and carrier. Other advantages include the formation of a product which is in high yield and yet does not require for its preparation the long tedious crystallization process.

It has been found that concentrates of vitamin B$_{12}$ having a purity ranging from about 500 micrograms per gram of solids to about 20,000 micrograms per gram of solid or even higher may be very favorably treated by the present process. These concentrates as noted above may be combined with various proportions of carrier to form dry solid products having a potency of from about 100 to about 5,000 micrograms per gram of dry solid. The aqueous solution of vitamin $B_{12}$ used as starting material for the present process desirably has a potency of from about 200 to about 5,000 micrograms per milliliter.

It has been found that in order to avoid a gummy product, the water concentration of the feed solutions of vitamin $B_{12}$ should preferably be not more than about 50% by volume, that is, at least an equal volume of an organic liquid such as acetone, methanol or ethanol should be premixed with the vitamin $B_{12}$ solution before the latter is mixed with the main volume of acetone containing the solid carrier. In general, it is advisable to have in the final mixture at least 90% by volume of acetone for precipitating the vitamin $B_{12}$ product. The use of lower concentrations of acetone tends to produce gummy products. The optimum proportions of the various materials will vary with the purity of the vitamin $B_{12}$ used as starting material and with the nature of the impurities present in this material.

The following examples are given by way of illustration only, and are not intended as a limitation on the scope of this invention. In fact, as many widely varying embodiments are possible without departing from the spirit and scope of the herein described invention, it is to be understood that this invention is to be limited by the specific wording of the appended claims only.

*Example I*

A vitamin $B_{12}$ concentrate prepared from fermentation sources and partially purified by ion exchange resins was used as starting material. This concentrate had a potency on a dry basis of about 9,000 micrograms of activity per gram of solids. It was concentrated to a liquid concentrate of 1,000 micrograms per milliliter. 20 volumes of dry acetone per volume of aqueous vitamin $B_{12}$ solution was placed in a vessel with a mechanically driven agitator. The aqueous vitamin $B_{12}$ solution was premixed with an equal volume of acetone. To the larger volume of acetone was added sufficient dry dicalcium phosphate to yield a product of about 1,000 micrograms per gram of activity after precipitation of all the vitamin $B_{12}$ on the dicalcium phosphate. The aqueous-acetone solution of vitamin $B_{12}$ was gradually added to the stirred suspension of dicalcium phosphate in acetone. After addition had been completed, the mixture was stirred for a short time and then allowed to settle. A large proportion of the supernatant liquid was drained off and additional acetone was added to the solid material. The mixture was stirred for a short time and then the product was filtered on a porcelain filter. The crystalline product was dried under vacuum at slightly elevated temperature. Approximately 85% of the vitamin $B_{12}$ in the aqueous concentrate was recovered in the form of a dry, uniform, solid, having an activity of 1,000 micrograms of vitamin $B_{12}$ per gram. This product proved to be particularly useful for the preparation of vitamin $B_{12}$ products for pharmaceutical use by oral administration.

*Example II*

A partially purified aqueous concentrate of vitamin $B_{12}$ having a volume of 50 milliliters and a solid content of 7.7 grams was premixed with 50 milliliters of methanol. 75 grams of mannitol was suspended in one liter of acetone. The aqueous-methanol solution of vitamin $B_{12}$ was gradually added to the mannitol suspension with continuous stirring. After addition had been completed, the mixture was stirred for a short period of time and then allowed to settle. The supernatant liquid was decanted, and the solid product was resuspended in a small volume of acetone. The product was then filtered, washed with a small volume of acetone and dried under vacuum. Approximately 95% of the vitamin activity was recovered in the solid product. The material had no gumminess and served as an excellent source of vitamin $B_{12}$ activity for pharmaceutical products.

What is claimed is:

1. A process for the preparation of a solid vitamin $B_{12}$ product which comprises premixing an aqueous concentrate of vitamin $B_{12}$ with an approximately equal volume of an organic liquid selected from the group consisting of acetone, ethanol and methanol, mixing this premixture with a volume of acetone which is at least nine times as large and which contains a suspension of a trituration diluent, separating the solid vitamin $B_{12}$ bearing product and drying said product.

2. A process as claimed in claim 1 wherein the trituration diluent is chosen from the group consisting of dicalcium phosphate, starch, mannitol and sodium chloride.

3. A process as claimed in claim 1 wherein the organic liquid is acetone.

4. A process for the preparation of a solid vitamin $B_{12}$ product which comprises mixing a partially purified aqueous concentrate of vitamin $B_{12}$ with approximately an equal volume of acetone and adding said mixture to an agitated suspension of dicalcium phosphate in approximately 10 volumes of acetone, separating the solid vitamin $B_{12}$ bearing product and drying said product.

References Cited in the file of this patent

UNITED STATES PATENTS

| | | |
|---|---|---|
| 2,378,147 | McGeorge | June 12, 1945 |
| 2,563,794 | Rickes | Aug. 7, 1951 |
| 2,582,589 | Fricke | Jan. 15, 1952 |

OTHER REFERENCES

Smith: Proceedings of the Biochemical Society in Biochemical Journal, vol. 43, October 1948, pp. 8–9.